(12) United States Patent  (10) Patent No.: US 7,621,384 B2
Hinkel  (45) Date of Patent: Nov. 24, 2009

(54) HYDRODYNAMIC TORQUE CONVERTER

(75) Inventor: Rüdiger Hinkel, Rthlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 358 days.

(21) Appl. No.: 11/314,302

(22) Filed: Dec. 20, 2005

(65) Prior Publication Data

US 2006/0137952 A1 Jun. 29, 2006

(30) Foreign Application Priority Data

Dec. 23, 2004 (DE) ........................ 10 2004 062 080

(51) Int. Cl.
*F16D 33/18* (2006.01)
*F16H 45/02* (2006.01)
(52) U.S. Cl. .................. 192/3.21; 192/45; 192/45.1; 192/110 B; 192/207; 60/345
(58) Field of Classification Search ................ 60/345, 60/338; 192/3.21, 3.28, 45, 55.3, 55.6, 110 B, 192/207
See application file for complete search history.

(56) References Cited

U.S. PATENT DOCUMENTS

| | | | |
|---|---|---|---|
| 3,876,047 A * | 4/1975 | Rist ........................ | 192/45 |
| 4,106,602 A * | 8/1978 | Dieckermann ............. | 192/45 |
| 4,523,916 A | 6/1985 | Kizler et al. | |
| 4,819,776 A * | 4/1989 | Leitz et al. ................ | 192/45 |
| 5,482,150 A * | 1/1996 | Stark ......................... | 192/45 |
| 5,575,363 A | 11/1996 | Dehrmann et al. | |
| 6,173,824 B1 * | 1/2001 | Roberts .................... | 192/45 |
| 2002/0011392 A1 * | 1/2002 | Yoshimoto et al. ....... | 192/212 |

FOREIGN PATENT DOCUMENTS

| | | |
|---|---|---|
| DE | 32 22 119 | 10/1983 |
| DE | 44 23 650 | 6/1995 |
| DE | 101 31 768 | 1/2003 |

* cited by examiner

*Primary Examiner*—Richard M. Lorence
*Assistant Examiner*—Derek D. Knight
(74) *Attorney, Agent, or Firm*—Cohen Pontani Lieberman & Pavane LLP

(57) ABSTRACT

A hydrodynamic torque converter comprises a pump wheel, a turbine wheel, and a stator, which combine to form a hydrodynamic circuit. The stator is centered with respect to an axis of rotation and has a freewheel hub so that it can be mounted on a freewheel, which hub is carried by a radially outer freewheel component and is connected by means of a transmission element part to a radially inner freewheel component with freedom of relative rotation. At least one first freewheel component has a damping device, which serves to reduce the ability of this freewheel component to rotate relative to the other, second freewheel component and which for this purpose can be brought into working connection with the second freewheel component.

10 Claims, 4 Drawing Sheets

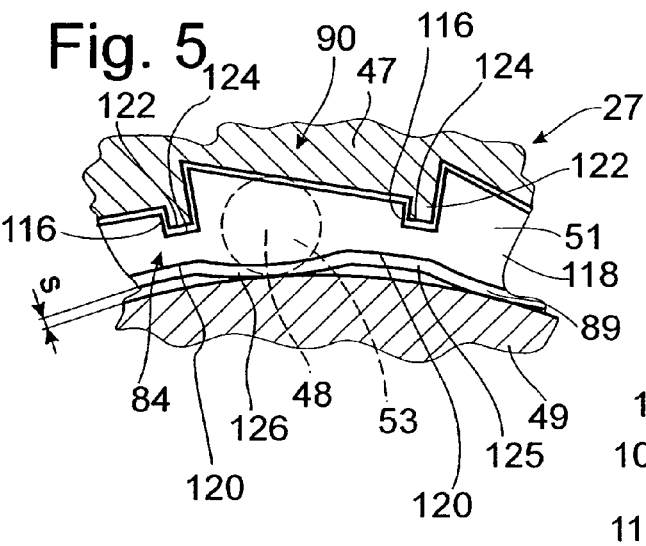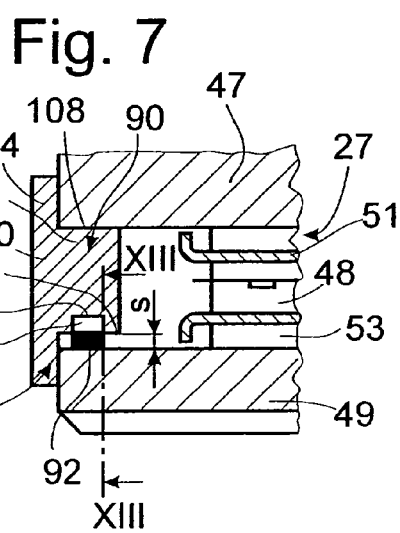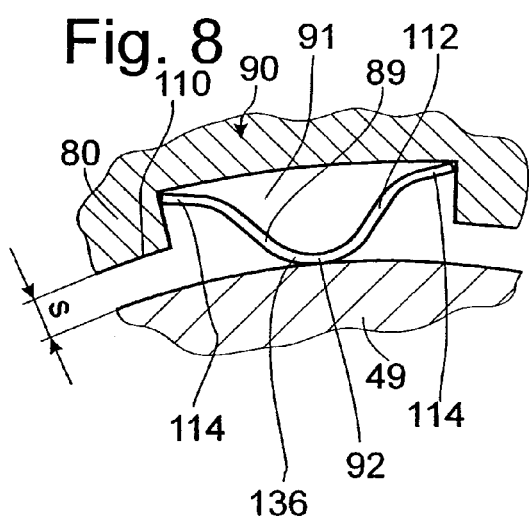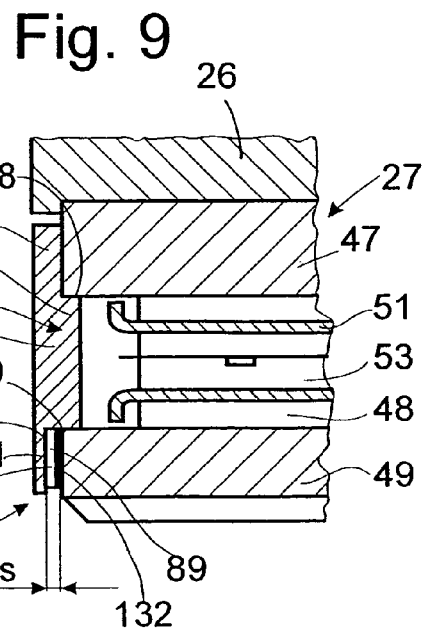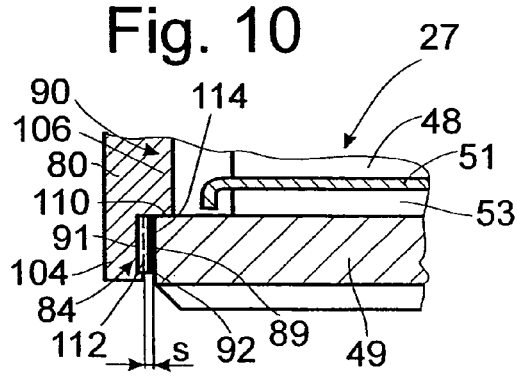

ns of a stamping operation and then pressed out and away from the previously mentioned edge areas by means of a forming operation, so that elastically deformable press-outs are created, which project radially from the remaining edge areas, which define the base surface. The press-outs can extend only in the direction of one of the freewheel components or in the direction of both freewheel components.

HYDRODYNAMIC TORQUE CONVERTER

BACKGROUND OF THE INVENTION

1. Field of the Invention

The invention relates to a hydrodynamic torque converter with a pump wheel, a turbine wheel, and a stator which form a hydrodynamic circuit.

2. Description of the Related Art

A hydrodynamic torque converter provided with a pump wheel, a turbine wheel, and a stator, which combine to form a hydrodynamic circuit, is known from DE 101 31 768 A1. As a result of the flow conditions in the hydrodynamic circuit, the turbine wheel can be deflected axially toward the pump wheel in "pull" mode and in the opposite direction in "push" mode and is in working connection with a first component of the freewheel by means of at least one axial bearing on the drive side of the freewheel and at least one drive-side thrust washer. The first freewheel component is formed by an outer body, which holds the stator hub. On the takeoff side, the outer body is supported against the pump wheel hub by a takeoff-side thrust washer and a takeoff-side axial bearing. The freewheel also has a second component, formed by an inner body, which is centered on the first component by the thrust washers, is free to rotate relative to that first component, and is supported nonrotatably on a part permanently attached to the housing such as a support shaft.

In freewheels of this type which form part of a stator, especially in cases where the hydrodynamic torque converter is used in machines such as bucket wheel loaders, the following problem occurs: It can be desirable to introduce shock-like loads such as when the loading bucket is to cut into solid ground or when the loading bucket is to be dumped all at once. These types of shock-like loads are produced by the very rapid closing of at least one clutch in a multi-step reduction gear connected to the torque converter, and they are transmitted as torque spikes to the torque converter, where they arrive at the freewheel of the stator. This can lead to malfunctions or even to the failure of the freewheel.

SUMMARY OF THE INVENTION

An object of the invention is to provide measures for protecting the freewheel from torque spikes.

Advantage is taken of the fact that at least two components of any freewheel must be able to move in the circumferential direction with respect to each other, where in the normal case one of the freewheel components, preferably the radially inner one, is mounted nonrotatably on a stationary support shaft of the hydrodynamic torque converter and thus is also unable to rotate around an axis of rotation of the hydrodynamic torque converter, whereas the other freewheel component, thus the radially outer one, usually holds the hub of the stator, which is mounted axially between the pump wheel and the turbine wheel. Because the stator, under certain flow conditions in the hydrodynamic circuit formed between the pump wheel, the turbine wheel and the stator, must be able to rotate around the axis of rotation of the hydrodynamic torque converter, it is mounted so that it can rotate in the circumferential direction relative to the stationary freewheel component.

A transmission element part is often provided radially between the two freewheel components. This transmission element part has an element cage, which holds a plurality of transmission elements, which, when in the form of rolling elements, are intended to ensure that the freewheel component with freedom to rotate relative to the stationary freewheel component can rotate without friction. Because the omission of this type of transmission element part between the two freewheel components would lead to a great deal of friction, which would be difficult to control, it can also be advantageous for the object of the invention to be provided with a transmission element part between the two freewheel components. It is mandatory, however, that a damping device be provided in the invention between the two freewheel components to reduce the ability of one of the freewheel components, preferably the radially outer freewheel component, referred to below as the first freewheel component, to rotate relative to the radially inner component, referred to below as the second freewheel component. For this purpose, the damping device, to which the first freewheel component can be assigned either directly or indirectly by the use of another component such as a drive-side thrust washer, can be brought into working connection with the second freewheel component preferably by the use of at least one elastic element assigned to the damping device. This elastic element is supported at one end against a holder assigned to the first freewheel component or to the additional component and at the other end against the second freewheel component and is thus able to generate a predetermined pressing force, which establishes the working connection between the damping device and the second freewheel component. The pressing force exerted by the elastic element on the second freewheel component can act essentially in the radial direction or essentially in the axial direction.

The elastic element can preferably be arranged in a recess in a holder provided for this purpose, so that only a predetermined section of the element projects beyond the holder toward the second freewheel component. As a result, the holder assigned to the first freewheel component can be brought very close to the second freewheel component, so that there is only a small gap S between the two freewheel components.

In a preferred embodiment of an elastic element positioned in a recess in the holder, this element is designed as a spring clip with two sidepieces. The section which projects beyond the recess toward the adjacent freewheel component is in the form of a bulge extending in the circumferential direction between the two sidepieces of the spring. It is this bulge which rests against the second freewheel component.

Various embodiments of the damping device are conceivable. For example, it can have a spring ring with a collar on at least one radial side. The collar is provided with pressed-out sections, which project radially beyond the base surface. These sections are preferably freed from the edge areas of the surrounding material, consisting of spring steel, by means of a stamping operation and then pressed out and away from the previously mentioned edge areas by means of a forming operation, so that elastically deformable press-outs are created, which project radially from the remaining edge areas, which define the base surface. The press-outs can extend only in the direction of one of the freewheel components or in the direction of both freewheel components.

If the elastic element projects only in the direction of one of the freewheel components, it can be held in place nonrotatably on the first freewheel component by making it part of an element cage installed radially between the two freewheel components. The cage itself engages nonrotatably with the first freewheel component. This is an easy way to realize an arrangement in which the damping device is located radially between the two freewheel components. The press-outs of the spring ring provided in this way on the element cage can thus be supported against the second freewheel component and establish the desired working connection between the two components required to reduce the ability of the two freewheel components to rotate with respect to each other. Because, in this embodiment, the element cage must be prevented from moving in the circumferential direction, it is provided with antitwist protection, which is advantageously obtained by providing at least one radial projection on the freewheel component facing away from the spring ring. This projection engages in a corresponding radial recess in the element cage. During relative motion between this freewheel component and the other freewheel component, the press-outs of the spring ring slide along the facing side of the other freewheel component.

According to a simpler design, the spring ring is made with two collars, each of which is provided with press-outs radially projecting from their associated base surfaces. The first collar is assigned to the one freewheel component, the second collar to the other. The spring ring is inserted between the two freewheel components and is in nonpositive connection with both of them. The ability of the first freewheel component, for example, to rotate relative to the second freewheel component can be reduced in this way as well.

Whereas, in the previously described embodiments, the elastic element of the damping device always acts directly between the two freewheel components, embodiments are also conceivable, as previously mentioned, in which the connection of the elastic element to at least one freewheel component is only indirect, such as by way of a thrust washer assigned to that one freewheel component. A first axial section of the thrust washer forms an axial boundary for this freewheel component, and a second axial section extends into the radial area between the two freewheel components, where it assumes a radially fixed position on one of the two freewheel components, whereas only an elastic connection via the elastic element is present with respect to the other freewheel component. The radial side of the second axial section of the thrust washer, i.e., the side which holds the elastic element, can be brought up closely to the assigned freewheel component, leaving only a gap S, after the elastic element has been inserted into a radial recess in the second axial section. Whereas, in a design of this type with a radially-acting elastic element, it is ensured within the deformation range of this element that the freewheel component assigned to this element will be centered elastically with respect to the other freewheel component, in the case of an axial arrangement of the elastic element in or on the first axial section of the thrust washer, the two freewheel components will be centered with respect to each other without elasticity, whereas the ability of the two freewheel components to rotate relative to each other is still reduced.

This advantage of the axial arrangement of the elastic element exists regardless of whether this element is inserted into a recess in the first axial section or is supported against a flat axial side of this first axial section. The only differences pertain to the design of the elastic element itself, where, as previously mentioned, if the elastic element is inserted into a recess, it is preferable that it be designed as a spring clip with sidepieces. If, however, the elastic element is arranged between a flat axial side of the first axial section and the corresponding side of the adjacent freewheel component, it is preferable that it be designed as a wave washer, which encircles the axis of rotation in an essentially ring-like manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 5 shows another embodiment of the freewheel;

FIG. 7 shows another embodiment of the freewheel;

FIG. 8 show a detailed view of the elastic element of the freewheel of FIG. 7;

FIG. 9 shows another embodiment of the freewheel; and

FIG. 10 shows yet another embodiment of the freewheel.

DETAILED DESCRIPTION OF THE PRESENTLY PREFERRED EMBODIMENTS

Figure 1:
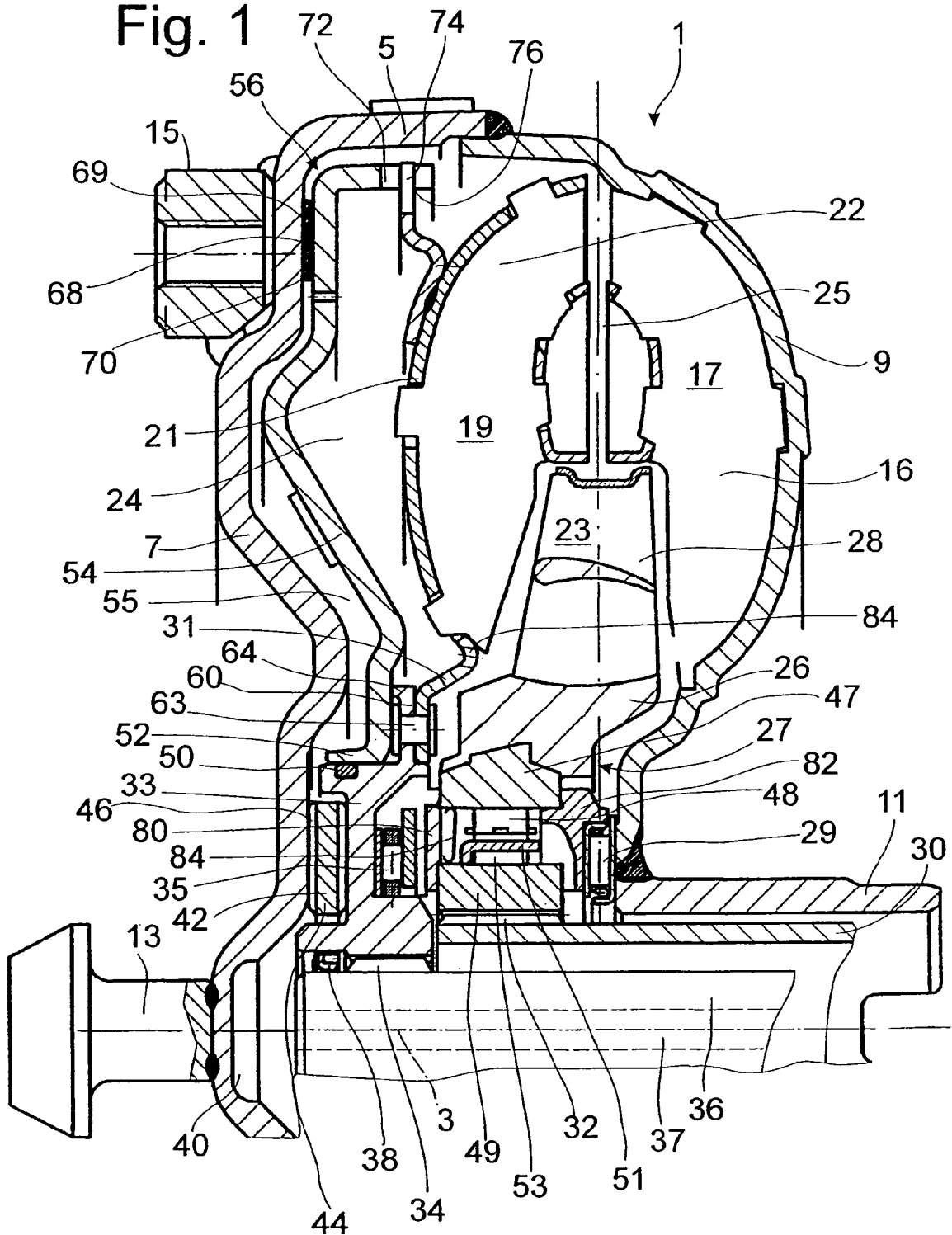
FIG. 1 shows the upper half of a longitudinal cross section through a hydrodynamic torque converter with a stator and a freewheel assigned to the stator, the freewheel being provided with an elastic element.

FIG. 1 shows a hydrodynamic torque converter 1, which is able to rotate around an axis of rotation 3. The hydrodynamic torque converter 1 has a converter housing 5, which has a converter cover 7 on the side facing a drive unit such as an internal combustion engine (not shown). The converter cover 7 is permanently attached to a pump wheel shell 9 which merges into a pump wheel hub 11 in the radially inner area.

The converter cover 7 has, in the radially inner area, a bearing journal 13, which is mounted in a known manner and therefore is not explained in detail, on an element of the drive unit, such as a crankshaft, to center the converter housing 5 on the drive side. In addition, the converter cover 7 has a fastening mount 15, which usually serves to fasten the converter housing 5 to the drive unit, preferably by way of a flexplate (not shown). FIG. 1 of U.S. Pat. No. 4,523,916, which is incorporated herein by reference, shows how the bearing journal of a torque converter is mounted in a crankshaft of a drive unit and how the torque converter is connected by way of a flexplate to the crankshaft.

The previously mentioned pump wheel shell 9 and pump wheel vanes 16 together form a pump wheel 17, which works together with a turbine wheel 19 equipped with a turbine wheel shell 21 and turbine wheel vanes 22. Pump wheel 17, turbine wheel 19, and stator 23 form a hydrodynamic circuit 24, which is known in the art. The hydrodynamic circuit 24 encloses an internal torus 25.

The stator 23 has stator vanes 28, which are provided on a hub 26 mounted on a freewheel 27. The freewheel 27, as can be seen more clearly in FIG. 2, has a first freewheel component 47 in the form of an essentially ring-shaped outer body 57, a transmission element part 48 with a plurality of transmission elements 53, which are positioned by an element cage 51, and a second freewheel component 49 in the form of an essentially ring-shaped inner body 59. The outer body 57 centers the inner body 59 by means of a drive-side thrust washer 80 and a takeoff-side thrust washer 82 (FIG. 1). For this purpose, the drive-side thrust washer 80 has a first axial section 104 with axial contact surfaces (FIG. 7), which come in contact with the two freewheel components 47, 49, and a second axial section 106 (FIG. 7), which adjoins the first axial section 104 in the direction toward the freewheel components 47, 49 and extends axially into the radial area between the two freewheel components 47, 49. The radially outer surface 108 of the second axial section centers the thrust washer 82 on the first freewheel component 47, whereas the radially inner surface 110 centers the second freewheel component 49. The takeoff-side thrust washer 82 corresponds to the drive-side thrust washer 80 with respect to both function and design and therefore requires no further explanation.

On the side facing away from the drive-side axial bearing 35, the first freewheel component 47 is supported axially against the pump wheel hub 11 by the takeoff-side thrust washer 82 and a takeoff-side axial bearing 29. The second freewheel component 49, however, is mounted by way of a set of teeth 32 on a support shaft 30, which is located radially inside the pump wheel hub 11. The second freewheel component 49 is therefore unable to rotate, but it is able to shift position axially on the shaft. The support shaft 30, which is hollow, encloses in turn a transmission input shaft 36, which is provided with a central bore 37 for the passage of hydraulic fluid. The transmission input shaft 36 has a set of teeth 34 by which it holds the turbine wheel hub 33 in such a way that the turbine wheel hub 33 cannot rotate but can shift position axially. The turbine wheel hub 33 is supported on one side against an axial bearing 44 on the converter cover 7 and serves on the other side as a contact surface for the previously mentioned drive-side axial bearing 35 and also for the freewheel 27 by way of the drive-side thrust washer 80. Radially on the inside, the turbine wheel hub 33 is sealed off against the transmission input shaft 36 by means of a seal 38.

The previously mentioned central bore 37 in the transmission input shaft 36 serves to supply the hydrodynamic circuit 24 and to apply pressure to a bridging clutch 56, to be explained further below, for which purpose a connection to a control device and a reservoir of hydraulic fluid are required. Neither the control device nor the hydraulic fluid reservoir is shown in the drawing, but reference can be made for this purpose by way of example to FIG. 1 of U.S. Pat. No. 5,575,363, which is incorporated herein by reference.

Hydraulic fluid which has entered through the central bore 37 in the transmission input shaft 36 arrives in a transition space 40, and from there it passes through supply channels 46 of the axial bearing 44, serving as a flow passage 42, in the radially outward direction to a chamber 55, located axially between the converter cover 7 and a piston 54 of the previously mentioned bridging clutch 56. The piston 54 is centered on the converter cover 7, and the side of this piston which faces away from the chamber 55 faces the hydrodynamic circuit 24. Depending on the pressure relationships in the hydrodynamic circuit 24 and in the chamber 55, the piston can be moved between two different limit positions, which will be discussed further below. The base 52 of the piston 54 is supported on the turbine wheel hub 33 and is thus able to slide axially. A piston seal 50 recessed into the turbine wheel hub 33 performs a sealing function with respect to the piston base 52. In its radially inner area, the piston 54 is attached to a holding device 60 by tangential leaf springs (not shown) and riveted joints (not shown). The holding device 60 is an integral part of the turbine wheel hub 33 and is connected by additional riveted joints 63 to the base 31 of the turbine wheel 19.

The piston 54 is provided on its outer circumference with a plurality of openings 72—distributed around the circumference—which are communicated with the opposing openings 74 of an antitwist protection device 76. The latter is attached in turn to the turbine wheel shell 21. It remains to be noted that the openings 72/opposing openings 74 connect the piston 54 nonrotatably to the antitwist protection device 76 while allowing freedom of axial movement.

On the side facing the converter cover 7, the radially outer area of the piston 54 carries a friction lining 68, which surrounds the axis of rotation 3 in a ring-like manner. On the side facing away from the piston 54, to be called the friction area 69 below, this friction lining 68 can be brought into nonpositive engagement with an opposing friction area 70 provided on the converter cover 7, provided that the pressure in the hydrodynamic circuit 24 is greater than that in the chamber 55 on the opposite side of the piston 54.

The first of the previously mentioned limit positions of the piston 54 is reached when the friction area 69 of the friction lining 68 has come to rest nonpositively against the opposing friction area 70. The second limit position is assumed when the pressure in the chamber 55 is greater than that in the hydrodynamic circuit 24 and the piston 54 accordingly is shifted axially against the action of the tangential leaf springs, which are trying to push the piston 54 toward the converter cover 7, until it rests against a stop 64 of the holding device 60.

Figure 2:
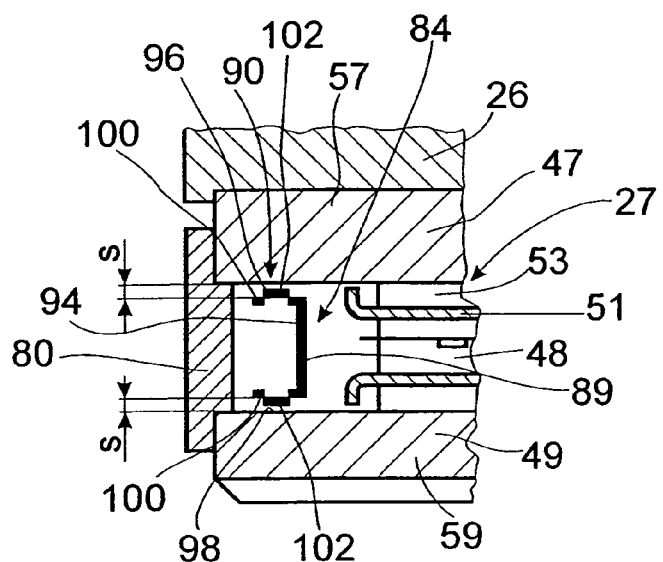
FIG. 2 shows an enlarged view of the part of the freewheel with the elastic element.
Figure 3:
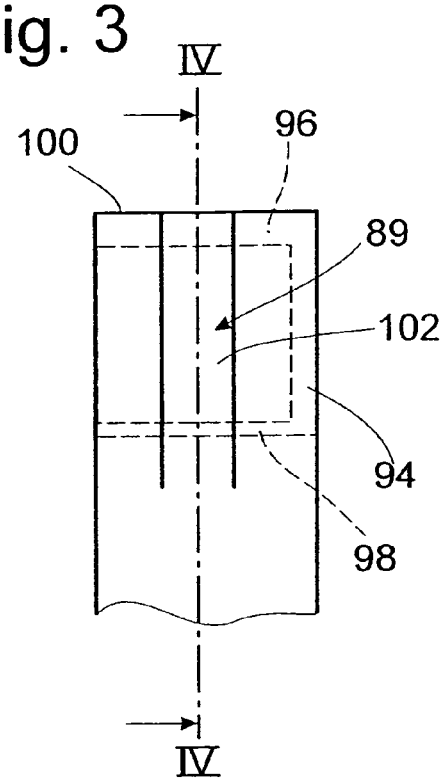
FIG. 3 shows another enlarged view of a section of the elastic element.

As can be seen in FIG. 1 in merely schematic fashion, the freewheel 27 has a damping device 84, shown in detail FIG. 2 on an enlarged scale, radially between the two freewheel components 47 and 49 and axially between the drive-side thrust washer 80 and the transmission element part 48. This damping device 84 consists essentially of an elastic element 89, which is designed as a spring ring 94 (FIG. 2), which encircles the axis of rotation 3 as shown in FIG. 3. This spring ring 94 has a first collar 96 on the radially outer side and a second collar 98 on the radially inner side. The radially outer collar 96 is shown separately on an enlarged scale in FIG. 3 which makes it possible to see that, in the center area of the axial part of the spring ring 94, a pressed-out area 102 is provided, which projects radially from an otherwise cylindrical base surface 100. As a glance at FIG. 4 reveals, a plurality of these radially projecting, pressed-out areas 102 are provided around the circumference of the spring ring 94, projecting both radially outward from the base surface 100 in question and also radially inward. These pressed-out areas 102 are produced by first subjecting the spring ring 94, which is made of spring steel, for example, to a stamping operation to free the areas 102 to be pressed out later from the base surface 100, so that, in the course of the subsequent forming operation, the pressed-out areas 102 in the case of the radially outer collar 96 can be pushed radially outward from the base surface 100, whereas, in the case of the radially inner collar 98, the areas 102 can be pushed radially inward from the base surface 100. The pressed-out areas 102 thus formed give the spring ring 94 radially elastic areas, by means of which, after insertion radially between the two freewheel components 47, 49 as shown in FIG. 2, a frictional connection can be established between the two freewheel components 47, 49. For the sake of clarity, gaps are shown in FIG. 2, One gap between the collar 96 and the associated freewheel component 47, the other gap between the collar 98 and its associated freewheel component 49, but in reality the pressed-out areas 102 are, of course, actually in contact with the associated sides of the freewheel components 47, 49.

Figure 4:
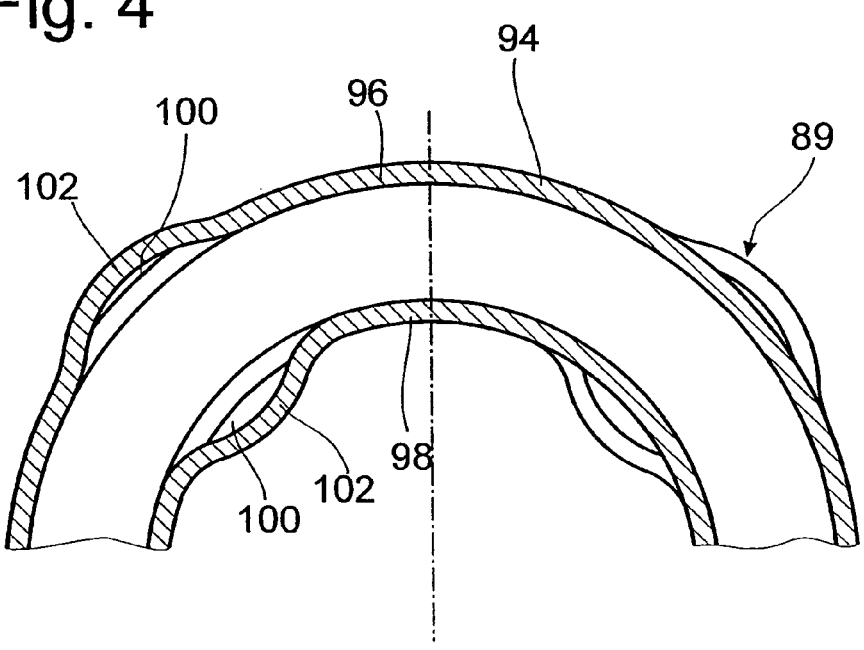
FIG. 4 shows a cross-sectional view of the elastic element along line IV-IV of FIG. 3.
Figure 6:
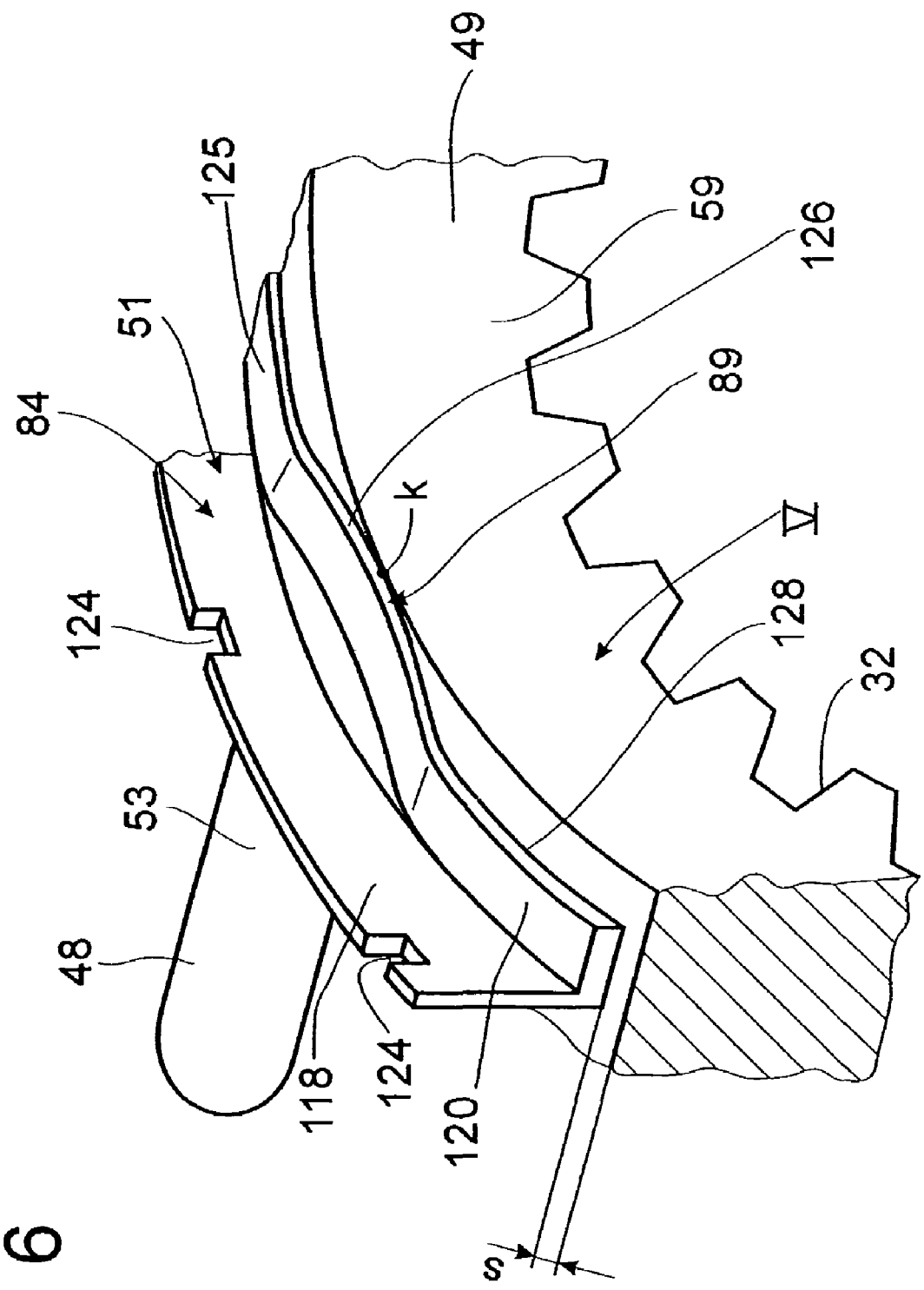
FIG. 6 shows a three-dimensional view of the freewheel of FIG. 5.

The principle of the spring ring 94 previously described on the basis of FIGS. 3 and 4 is also used in the design according to FIGS. 5 and 6. Here, as can be seen in FIG. 5, an element cage 51 is held radially between the two freewheel components 47, 49. This element cage 51 is used to support essentially cylindrical transmission elements 53, shown in broken line, to form a transmission element part 48. The reason why the transmission element 53 in FIG. 5 is shown in broken line is because the element cage 51 according to FIG. 6 has an essentially vertical bearing sidepiece 118, against one side of which the transmission element 53 is supported, whereas a collar 120, acting as an elastic element 89, is provided on its other side. This collar 120 is formed as an integral part of the bearing sidepiece 118 and is designed to function as a spring ring 125, which, at least in the area of a base surface 128, surrounds in a ring-like manner the freewheel component 49, leaving only a gap S. In the circumferential areas between two base surfaces 128 of the spring ring 125 are pressed-out areas 126, only one of which is shown in FIG. 6. This figure shows that the pressed-out area 126 is obtained by first freeing the area in question from the bearing sidepiece 118 and then by deforming it radially inward toward the adjacent freewheel component 49 so that in this way it can engage nonpositively with the radially adjacent freewheel component 49 in a contact area K. Of course, it can be seen when looking in direction V of FIG. 6 (the direction also chosen for FIG. 5) that the spring ring 125 is situated axially in front of the bearing sidepiece 118, whereas the transmission elements 53 are situated behind it, so that these elements cannot be seen in FIG. 5 and thus must be drawn in broken line.

FIG. 5 also shows that, on the side facing the first freewheel component 47, the element cage 51 has an antitwist protection device 116, which prevents it from rotating relative to this freewheel component 47. The antitwist device 116 comprises a radial projection 122, which is part of the first freewheel component 47 and extends from it toward the second freewheel component 49 to engage in an assigned radial opening 124 in the bearing sidepiece 118 and thus in the element cage 51. As a result of this antitwist protection measure 116, the element cage 51 moves in common with the rotational movement of the first freewheel component 47 versus the second freewheel component 49. Although this movement occurs with very little friction versus the second freewheel component 49 because of the essentially cylindrical transmission elements 53, it nevertheless occurs with a precisely defined amount of friction, which comes about as a result of the frictional contact between the pressed-out areas 126 and the radially outer surface of the second freewheel component 49.

The damping device 84 according to FIG. 7 operates in similar fashion, where the drive-side thrust washer 80 should be fixed in position axially with respect to the first freewheel component 47. In addition, an antitwist protection device can also be present between the freewheel component 47 and the thrust washer 80; this can be accomplished, for example, by pressing the thrust washer 80 into the freewheel component 47 or by forming it as an integral part of that component. In contrast, a frictional connection is produced between the thrust washer 80 and the second freewheel component 49, namely, by means of the elastic element 89, which, in this embodiment, is inserted into a recess 91 in the radially inner side 110 of the second axial section 106 of the thrust washer 80. On an enlarged scale, FIG. 8 shows this elastic element 89 together with its assigned recess 91 in a cross-sectional view along line XIII-XIII in FIG. 7 and reveals that the recess 91 extends only around a limited extent of the circumference of the thrust washer 80. The elastic element 89 in this embodiment is designed as a spring clip 112 with a bulge 136, provided circumferentially between the two spring sidepieces 114. The bulge 136 extends radially beyond the radially inner surface 110 of the thrust washer 80 and makes frictional contact with the freewheel component 49. The bulge 136 serves here as the element section 92, which projects radially beyond the recess 91 toward the freewheel component 49.

FIG. 8 also shows that, because of the elastic element 89, only a gap S remains radially between the radially inner surface 110 of the thrust washer 80 and the associated freewheel component 49. This results in a compact design. In addition, the gap S simultaneously also limits the radial mobility of the second freewheel component 49 relative to the first freewheel component 47, which guarantees that the second freewheel component 49 will be adequately centered by the first freewheel component 47.

The embodiment of FIG. 9 offers even better centering with the same functionality. Here not only the radially outer surface 108 of the second axial section 106 of the thrust washer 80 comes to rest tightly against its assigned freewheel component 47 but also the radially inner surface 110 comes to rest against its freewheel component 49 . In this design, however, an essentially flat axial contact surface 130 is provided on the first axial section 104 of the thrust washer 80 in the radial area of the second freewheel component 49, against which flat contact surface a wave washer 134 encircling the axis of rotation 3 in an essentially ring-like manner comes to rest. The wave washer 134 has an axial contact side 132 facing away from the axial surface 130 of the thrust washer 80, and this side 132 rests axially against the freewheel component 49.

The embodiment according to FIG. 10 differs from that of FIG. 9 in that, instead of an essentially circular wave washer, spring clips 112 are inserted into the associated recesses 91. These spring clips 112 are each provided with a section 92 in the form of a bulge 136, which projects beyond the recess 91 and thus makes frictional contact with the adjacent axial side of the second freewheel component 49. Because the spring clips 112 used here are similar to those illustrated in FIG. 8, no further explanation is required.

In summary, it should be emphasized again that, in each of FIGS. 2-6, a freewheel component, preferably the first freewheel component 47, is used directly as a holder 90 for the elastic element 89 of the damping device 84, whereas in FIGS. 7-10, the drive-side thrust washer 80 centered by at least the freewheel component 47 serves indirectly as the holder 90 for the elastic element 89. Common to all the embodiments, however, is that the damping device 84 with the elastic element 89 is held in frictional contact with the other freewheel component, here with the second freewheel component 49. The damping device 84 therefore acts as a defined friction device between the two freewheel components 47 and 49.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claims is:

1. A hydrodynamic torque converter comprising:
a hydrodynamic circuit comprising a pump wheel, a turbine wheel, and a stator, the stator being centered around an axis of rotation and having a hub;
a freewheel comprising:
a first, radially outer freewheel component which carries the hub;
a second, radially inner freewheel component; and
a transmission element part, which connects the first freewheel component to the second freewheel component so that the first freewheel component can rotate with respect to the second freewheel component;
a damping device which damps rotation of the first freewheel component with respect to the second freewheel component when the damping device is in a working connection with the second freewheel component, wherein the damping device has an elastic element generating a predetermined pressing force to establish the working connection between the damping device and the second freewheel component, wherein the pressing force generated by the elastic element acts on the second freewheel component in an essentially axial direction; and
a thrust washer positioning the second freewheel component with respect to the first freewheel component, wherein the thrust washer comprises:
a first axial section axially supporting the first and second freewheel components, and having a recess for receiving the elastic element, the recess being in an axial area facing and radially corresponding to the second freewheel component, the elastic element having a section projecting beyond the recess toward, and resting against, the second freewheel component; and
a second axial section disposed between the first and second freewheel components and having a radially outer surface resting against the first freewheel component and a radially inner surface resting against the second freewheel component.

2. The hydrodynamic torque converter of claim 1, wherein the elastic element is a spring clip having a bulge section projecting beyond the recess toward, and resting against, the second freewheel component, the spring clip further has two sidepieces each extending from the bulge section.

3. A hydrodynamic torque converter comprising:
a hydrodynamic circuit comprising a pump wheel, a turbine wheel, and a stator, the stator being centered around an axis of rotation and having a hub;
a freewheel comprising:
a first, radially outer freewheel component which carries the hub;
a second, radially inner freewheel component; and
a transmission element part, which connects the first freewheel component to the second freewheel component so that the first freewheel component can rotate with respect to the second freewheel component; and
a damping device which damps rotation of the first freewheel component with respect to the second freewheel component when the damping device is in a working connection with the second freewheel component, wherein the damping device has an elastic element generating a predetermined pressing force to establish the working connection between the damping device and the second freewheel component, wherein the pressing force generated by the elastic element acts on the second freewheel component in an essentially axial direction; and
a thrust washer positioning the second freewheel component with respect to the first freewheel component, wherein the thrust washer comprises:
a first axial section axially supporting the first and second freewheel components, and having an axial contact surface for the elastic element, the axial contact surface facing and radially corresponding to the second freewheel component, the elastic element having an axial contact side which faces away from the axial contact surface of the first axial section and rests against the second freewheel component; and
a second axial section disposed between the first and second freewheel components and having a radially outer surface resting against the first freewheel component and a radially inner surface resting against the second freewheel component.

4. The hydrodynamic torque converter of claim 3, wherein the elastic element is an essentially ring-shaped wave washer encircling the axis of rotation.

5. A hydrodynamic torque converter comprising:
a hydrodynamic circuit comprising a pump wheel, a turbine wheel, and a stator, the stator being centered around an axis of rotation and having a hub;
a freewheel comprising:
a first, radially outer freewheel component which carries the hub;
a second, radially inner freewheel component; and
a transmission element part, which connects the first freewheel component to the second freewheel component so that the first freewheel component can rotate with respect to the second freewheel component; and
a damping device which damps rotation of the first freewheel component with respect to the second freewheel component when the damping device is in a working connection with the second freewheel component, wherein the damping device has an elastic element generating a predetermined pressing force to establish the working connection between the damping device and the second freewheel component, wherein the elastic element is a spring ring having a radially outer side and a radially inner side and a collar axially extending from the radially inner side, the collar having a base surface and a plurality of spring sections projecting radially inward from the base surface.

6. The hydrodynamic torque converter of claim 5, wherein the elastic element is supported at a first side by the first freewheel component and at a second side by the second freewheel component.

7. The hydrodynamic torque converter of claim 5, wherein the pressing force generated by the elastic element acts on the second freewheel component in an essentially radial direction.

8. The hydrodynamic torque converter of claim 5, wherein the elastic element is disposed axially adjacent to the transmission element part and radially between the first and second freewheel components.

9. A hydrodynamic torque converter comprising:
a hydrodynamic circuit comprising a pump wheel, a turbine wheel, and a stator, the stator being centered around an axis of rotation and having a hub;
a freewheel comprising:
a first, radially outer freewheel component which carries the hub;

a second, radially inner freewheel component; and a transmission element part, which connects the first freewheel component to the second freewheel component so that the first freewheel component can rotate with respect to the second freewheel component;

a damping device which damps rotation of the first freewheel component with respect to the second freewheel component when the damping device is in a working connection with the second freewheel component, wherein the damping device has an elastic element generating a predetermined pressing force to establish the working connection between the damping device and the second freewheel component; and a thrust washer positioning the second freewheel component with respect to the first freewheel component, the thrust washer comprising a first axial section axially supporting the first and second freewheel components; and a second axial section disposed between the first and second freewheel components and having a radially outer surface resting against the first freewheel component, a radially inner surface, and a recess on the radially inner surface for receiving the elastic element, the elastic element having a section projecting beyond the recess toward, and resting against, the second freewheel component.

10. The hydrodynamic torque converter of claim 9, wherein the elastic element is a spring clip having a bulge section projecting radially inward beyond the recess and resting against the second freewheel component, the spring clip having two sidepieces in the recess.

* * * * *

UNITED STATES PATENT AND TRADEMARK OFFICE
CERTIFICATE OF CORRECTION

PATENT NO. : 7,621,384 B2  Page 1 of 1
APPLICATION NO. : 11/314302
DATED : November 24, 2009
INVENTOR(S) : Rüdiger Hinkel It is certified that error appears in the above-identified patent and that said Letters Patent is hereby corrected as shown below:

Title Page; should read;

--(75) Rüdiger Hinkel, ~~Rthlein~~ Roethlein (DE)--

Signed and Sealed this
Seventh Day of June, 2011

David J. Kappos
*Director of the United States Patent and Trademark Office*